US008003567B2

(12) United States Patent
Brooks et al.

(10) Patent No.: US 8,003,567 B2
(45) Date of Patent: Aug. 23, 2011

(54) NANOCOMPOSITE SUPPORT MATERIALS

(75) Inventors: Christopher Brooks, Dublin, OH (US); Arijit Bose, Lexington, MA (US); Jayashri Sarkar, Columbus, OH (US); Ganapathiraman Ramanath, Niskayuna, NY (US); Vijay T. John, Destrehan, LA (US)

(73) Assignees: Honda Motor Co., Ltd., Tokyo (JP); The Administrators of the Tulane Educational Fund, New Orleans, LA (US); Rhode Island Board of Governors for Higher Education, Providence, RI (US); Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 12/542,666

(22) Filed: Aug. 17, 2009

(65) Prior Publication Data

US 2011/0039692 A1 Feb. 17, 2011

(51) Int. Cl.
| | |
|---|---|
| B01J 23/02 | (2006.01) |
| B01J 23/00 | (2006.01) |
| B01J 23/08 | (2006.01) |
| C01B 33/12 | (2006.01) |
| C01B 13/00 | (2006.01) |
| C01G 25/02 | (2006.01) |
| C01G 27/02 | (2006.01) |
| C01F 7/02 | (2006.01) |
| C01C 1/00 | (2006.01) |
| C01D 1/02 | (2006.01) |

(52) U.S. Cl. ........ 502/439; 502/232; 502/349; 502/355; 423/335; 423/608; 423/625; 423/593.1

(58) Field of Classification Search .................. 502/439, 502/300, 349, 350, 351, 355, 232; 423/592.1, 423/593.1, 598, 594.12, 600, 608, 610, 625, 423/335–340
See application file for complete search history.

(56) References Cited

U.S. PATENT DOCUMENTS

| | | | |
|---|---|---|---|
| 4,956,329 A | 9/1990 | Chao et al. | |
| 6,221,805 B1 | 4/2001 | Yamashita et al. | |
| 6,228,340 B1 * | 5/2001 | Imhof et al. | 423/338 |
| 6,391,989 B1 | 5/2002 | Bohnen et al. | |
| 6,413,489 B1 * | 7/2002 | Ying et al. | 423/600 |
| 6,482,766 B1 | 11/2002 | Chaumette et al. | |
| 6,869,584 B2 * | 3/2005 | Ying et al. | 423/600 |
| 7,297,654 B2 | 11/2007 | Kimura et al. | |

(Continued)

OTHER PUBLICATIONS

Sarkar et al. "Surfactant-Templated Synthesis and Catalytic Properties of Patterned Nanoporous Titania Supports Loaded with Platinum Nanoparticles", Chem. Mater. 2008, 20, 5301-5306, Published Online: Jul. 30, 2008.*

(Continued)

*Primary Examiner* — Steven Bos
*Assistant Examiner* — Anthony J Zimmer
(74) *Attorney, Agent, or Firm* — Capitol City TechLaw, PLLC; Mark E. Duell

(57) ABSTRACT

The present teachings are directed toward hexagonally patterned porous titania synthesized from a titanium isopropoxide precursor using a viscous template of surface-active agents separating nanoscopic bicontinuous channels of water and isooctane. Subsequent catalyst metal salt reduction in the aqueous nanochannels deposits well-separated catalyst metal nanoparticles on the pore surfaces. These nanocomposites exhibit significantly higher carbon monoxide oxidation efficiency than that obtained with known supports with higher specific surface area; efficiency is believed to be due to decreased mass transfer resistance provided the presently disclosed support material.

18 Claims, 12 Drawing Sheets

U.S. PATENT DOCUMENTS

| | | | |
|---|---|---|---|
| 7,605,108 B2* | 10/2009 | Wakamatsu et al. | 502/326 |
| 2002/0110519 A1* | 8/2002 | Ying et al. | 423/600 |
| 2004/0087438 A1 | 5/2004 | Blechert et al. | |
| 2004/0171483 A1 | 9/2004 | Takeshima | |
| 2005/0152832 A1* | 7/2005 | Ying et al. | 423/600 |
| 2006/0120941 A1 | 6/2006 | Chen et al. | |
| 2007/0009417 A1 | 1/2007 | Wong et al. | |
| 2007/0066479 A1 | 3/2007 | Takeshima et al. | |

OTHER PUBLICATIONS

Giraud, Sophie, Guillaume Loupias, Hicham Maskrot, Nathalie Herlin-Boime, Sabine Valange, Erwan Guélou, Joël Barrault, and Zelimir Gabelica. 2007. "Dip-Coating on TiO2 Foams Using a Suspension of Pt-TiO2 Nanopowder Synthesized by Laser Pyrolysis—Preliminary Evaluation of the Catalytic Performances of the Resulting Composites in deVOC Reactions." Journal of the European Ceramic Society. vol. 27, pp. 931-936.

Francioso, L., D.S. Presicce, R Siciliano, and A Ficarella. 2007. "Combustion Conditions Discrimination Properties of Pt-Doped TiO2 Thin Film Oxygen Sensor." Sensors and Actuators B. vol. 123, pp. 516-521.

Kotsifa, Areti, Dimitris I. Kondarides, and Xenophon E. Verykios. 2007. "Comparative Study of the Chemisorptive and Catalytic Properties of Supported Pt Catalysts Related to the Selective Catalytic Reduction of NO by Propylene." Applied Catalysis B: Environmental. vol. 72, pp. 136-148.

Mizukoshi, Yoshiteru, Yoji Makise, Tatsuya Shuto, Jinwei Hu, Aki Tominaga, Sayoko Shironita, and Shuji Tanabe. 2007. "Immobilization of Noble Metal Nanoparticles on the Surface of TiO2 by the Sonochemical Method: Photocatalytic Production of Hydrogen from an Aqueous Solution of Ethanol." Ultrasonics Sonochemistry. vol. 14, pp. 387-392.

Han, You, Chang-jun Liu, and Qingfeng Ge. 2006. "Interaction of Pt Clusters with the Anatase TiO2(101) Surface: A First Principles Study." J. Phys. Chem. B. vol. 110, No. 14, pp. 7463-7472.

Iida, Hajime, and Akira Igarashi. 2006. "Characterization of a Pt-TiO2 (Rutile) Catalyst for Water Gas Shift Reaction at Low-Temperature." Applied Catalysis A: General. vol. 298, pp. 152-160.

Li, Yuexiang, Yanzhao Xie, Shaoqin Peng, Gongxuan Lu, and Shuben Li. 2006. "Photocatalytic Hydrogen Generation in the Presence of Chloroacetic Acids over Pt/TiO2." Chemosphere. vol. 63, pp. 1312-1318.

Panagiotopoulou, Paraskevi, and Dimitris I. Kondarides. 2006. "Effect of the Nature of the Support on the Catalytic Performance of Noble Metal Catalysts for the Water-Gas Shift Reaction." Catalysis Today. vol. 112, pp. 49-52.

Park, Hyunwoong, Jaesang Lee, and Wonyong Choi. 2006. "Study of Special Cases Where the Enhanced Photocatalytic Activities of Pt/TiO2 Vanish Under Low Light Intensity." Catalysis Today. vol. 111, pp. 259-265.

Sato, Yasushi, Makiko Koizumi, Toshihiro Miyao, and Shuichi Naito. 2006. "The CO-H2 and CO-H2O Reactions over TiO2 Nanotubes Filled with Pt Metal Nanoparticles." Catalysis Today. vol. 111, pp. 164-170.

Sreethawong, Thammanoon, and Susumu Yoshikawa. 2006. "Enhanced Photocatalytic Hydrogen Evolution over Pt Supported on Mesoporous TiO2 Prepared by Single-Step Sol-Gel Process with Surfactant Template." International Journal of Hydrogen Energy. vol. 31, pp. 786-796.

Alexeev, Oleg S., Soo Yin Chin, Mark H. Engelhard, Lorna Ortiz-Soto, and Michael D. Amiridis. 2005. "Effects of Reduction Temperature and Metal-Support Interactions on the Catalytic Activity of Pt/γ-Al2O3 and Pt/TiO2 for the Oxidation of CO in the Presence and Absence of H2." J. Phys. Chem. B. vol. 109, No. 49, pp. 23430-23443.

Lee, Jaesang, and Wonyong Choi. 2005. "Photocatalytic Reactivity of Surface Platinized TiO2: Substrate Specificity and the Effect of Pt Oxidation State." J. Phys. Chem. B. vol. 109, No. 15, pp. 7399-7406.

Liu, Zhaolin, Bing Guo, Liang Hong, and Huixin Jiang. 2005. "Physicochemical and Photocatalytic Characterizations of TiO2/Pt Nanocomposites." Journal of Photochemistry and Photobiology A: Chemistry. vol. 172, pp. 81-88.

Teoh, Wey Yang, Lutz Mädler, Donia Beydoun, Sotiris E. Pratsinis, and Rose Amal. 2005. "Direct (One-Step) Synthesis of TiO2 and Pt/TiO2 Nanoparticles for Photocatalytic Mineralisation of Sucrose." Chemical Engineering Science. vol. 60, pp. 5852-5861.

Wang, Xinchen, Jimmy C. Yu, Ho Yin Yip, Ling Wu, Po Keung Wong, and Suk Yin Lai. 2005. "A Mesoporous Pt/TiO2 Nanoarchitecture with Catalytic and Photocatalytic Functions." Chem. Eur. J. vol. 11, pp. 2997-3004.

Koinuma, Hideomi, and Ichiro Takeuchi. Jul. 2004. "Combinatorial Solid-State Chemistry of Inorganic Materials." Nature Materials. vol. 3, pp. 429-438.

Simmons, Blake A., Glen C. Irvin, Vivek Agarwal, Arijit Bose, Vijay T. John, Gary L. McPherson, and Nitash P. Balsara. 2002. "Small Angle Neutron Scattering Study of Microstructural Transitions in a Surfactant-Based Gel Mesophase." Langmuir. vol. 18, No. 3, pp. 624-632.

Subramanian, G., Vinothan N. Manoharan, James D. Thorne, and David J. Pine. 1999. "Ordered Macroporous Materials by Colloidal Assembly: A Possible Route to Photonic Bandgap Materials." Advanced Materials. vol. 11, No. 15, pp. 1261-1265.

Tauster, S. J., S. C. Fung, and R. L. Garten. Jan. 4, 1978. "Strong Metal-Support Interactions. Group 8 Noble Metals Supported on TiO2." Journal of the American Chemical Society. vol. 100, No. 1, pp. 170-175.

* cited by examiner

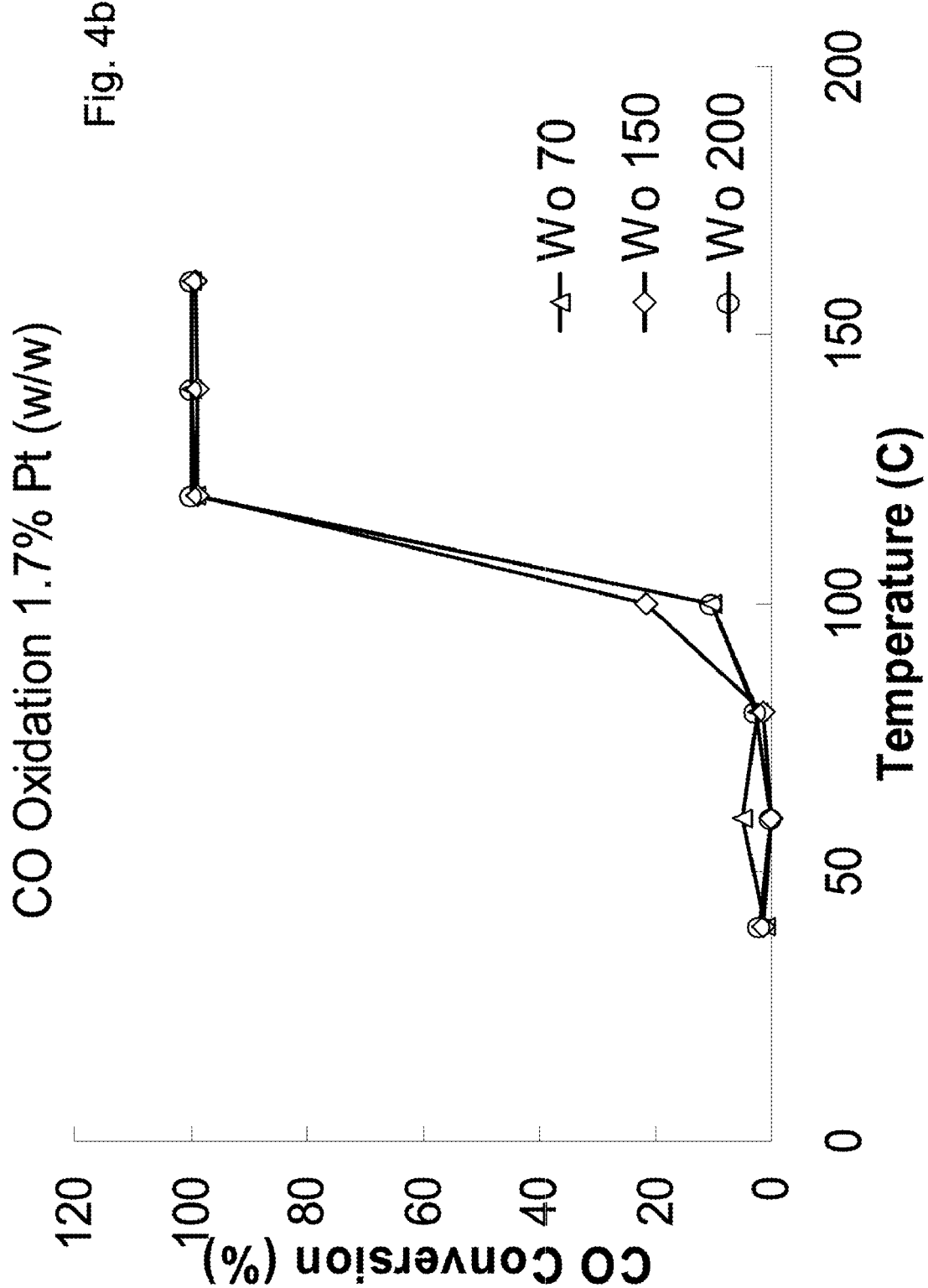

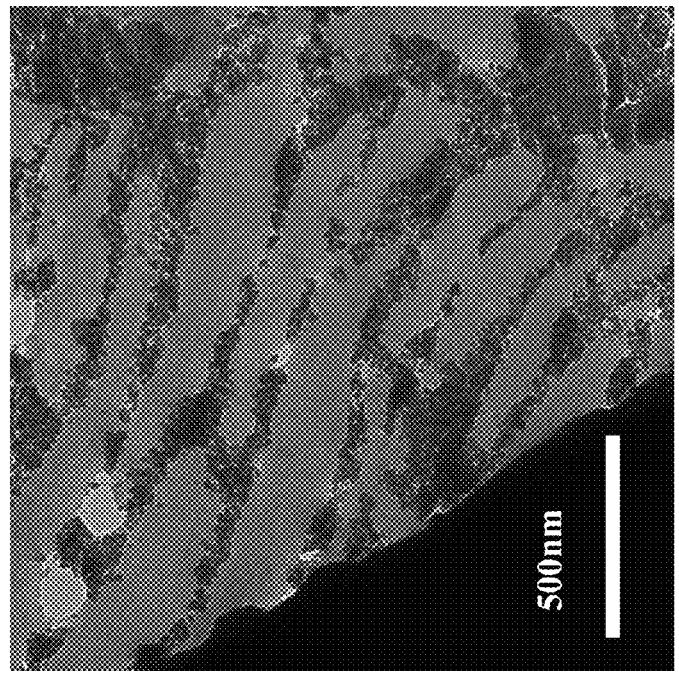
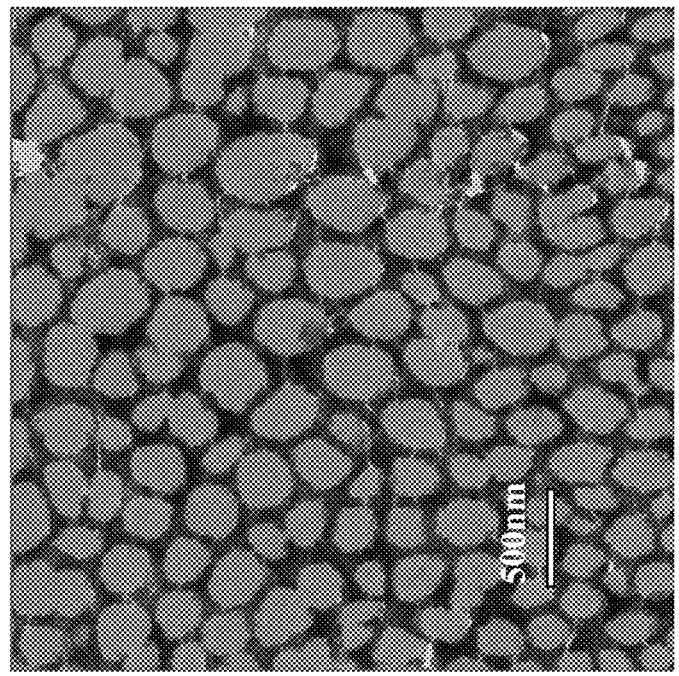
Fig. 7

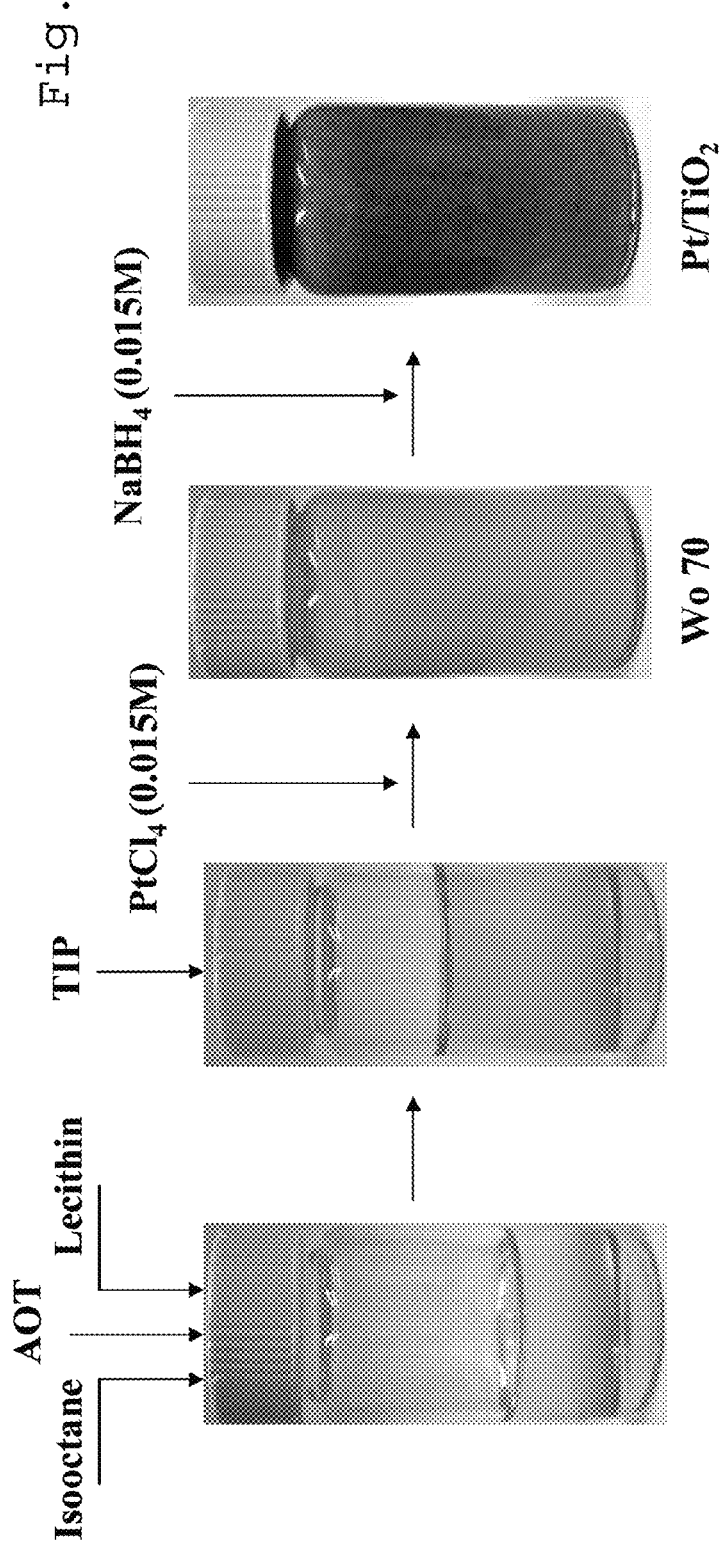

NANOCOMPOSITE SUPPORT MATERIALS

BACKGROUND

1. Field of the Invention

The present teachings relate to support material formulations, methods for synthesizing same, and their use as supports for catalytically active material, particularly for CO oxidation and lean burn deNOx control.

2. Discussion of the Related Art

Noble metal nanoparticles loaded on nanoporous titania ($TiO_2$) supports are attractive for catalyzing reactions germane to energy generation and environmental preservation, for example, photocatalytic generation of hydrogen from water and carbon monoxide (CO) oxidation. The efficiency of the $TiO_2$ supported catalysts is increased through electronic-structure-level interactions at the support-catalyst metal interface. For example, the amount of CO converted to $CO_2$ per unit mass of Pt catalyst per unit time (referred to as the turnover frequency, hereinafter "TOF") is hundredfold higher with a $TiO_2$ support than with a $SiO_2$ support over a temperature range of 150 to 550° C. Clearly, the catalyst and support chemistries, the support structure, and the catalyst particle distribution within the pores of the support are all parameters that impact the TOF and should be controlled to increase TOF.

Several techniques have been devised to synthesize catalyst-support composites, such as impregnation, sol-gel based processes, flame spray synthesis, electrodeposition, laser pyrolysis, sonochemistry and UV irradiation. In all of these processes, the support material, typically disordered, is prepared first, followed by the transfer to, or formation of, catalyst particles within the pores of the support material. Such sequential approaches have disadvantages such as pore plugging, insufficient control of catalyst distribution within the pores, and high costs due to production complexity. Disordered and disconnected pores in the support material can lead to increased mass transfer resistance.

There is a need for synthesis routes for supported catalyst that allow for formation of patterned and interconnected porous supports with catalyst nanoparticles of controllable size distributed throughout the support structure.

SUMMARY OF THE PRESENT DISCLOSURE

The present teachings are directed to a technique utilizing soft templates for the synthesis of highly organized nanoporous supports, such as anatase, having a uniform dispersion of Pt nanoparticles. The present teachings include a catalyst composite where both the support and the catalyst are synthesized using the same soft template, at room temperature. One feature of the present teachings is the distribution of the catalyst metal nanoparticles uniformly throughout the support with minimal agglomeration and pore blocking.

The process of the present teachings uses the principle of multi-component synthesis in the same template in the delineated domains of water and oil. This synthesis scheme exploits the organization provided by a surfactant, or surface-active agent, template system. A microemulsion containing a non-polar, non-aqueous solvent, and at least one surface-active agent, such as a surfactant and/or an emulsifier, for example, isooctane, dioctyl sulfosuccinate sodium salt (herein "AOT"), and lecithin upon addition of water produces a highly viscous bicontinuous 'gel' phase with nearly equal proportions of isooctane and water distributed as nanochannels. The high viscosity of this surfactant template phase is believed to be important for immobilizing the support structure and the precipitated catalyst nanoparticles.

In one specific example of the presently taught process, titanium isopropoxide (herein "TIP") can be dissolved in an organic solvent mixture prior to addition of the aqueous phase. Anatase titania can be formed by the hydrolysis and condensation of TIP. Since TIP is soluble in organic solvents, and has limited solubility in water, the $TiO_2$ forms at the oil/water interfaces. The role of the surface-active agents is to organize the template, and typically they do not participate in the reaction. Thus, the template remains intact and enables the $TiO_2$ to inherit the template microstructure. The samples can then be solvent dried and calcined using a programmed calcination procedure.

The present disclosure includes a method of preparing a support material composition by providing a first organic phase, a second organic phase, and an aqueous phase, and contacting the first and second organic phases to form a mixed organic phase. Then contacting and mixing the mixed organic phase with the aqueous phase to form a reaction mixture having an interface between the mixed organic phase and the aqueous phase, allowing a solid to precipitate, heating the reaction mixture to remove the liquids, and isolating the support material. In this present method, the first organic phase comprises a first non-polar, non-aqueous solvent, at least one surface-active agent which can be both a surfactant and/or an emulsifier, the second organic phase comprises a second non-polar, non-aqueous solvent and a support metal precursor. The resulting support material comprises oxides of the support metal precursor and has a macroporous structure.

Another method disclosed herein includes preparing a supported catalyst composition by providing a first organic component containing a non-polar, non-aqueous solvent, a support metal precursor, and least one surface-active agent, and an aqueous component comprising water and a catalyst metal precursor. The two components are contacted to form an emulsion phase. A reducing agent is provided and then contacted with the emulsion phase to form a reaction mixture. The reaction mixture is heated to remove any liquid components, and the supported catalyst composition is isolated. The supported catalyst composition is made of the oxides of the support metal arranged in a structure having both macropores and mesopores with particles of the reduced catalyst metal dispersed thereon.

Also disclosed herein is a process for the production of a supported catalyst material by providing a microemulsion comprising a first organic phase containing an organic solvent, at least one surface-active agent, such as an emulsifier, and/or a surfactant, and also providing a second organic solution containing a support metal precursor dissolved in the organic solvent. The second organic phase is contacted with the microemulsion to form an organic mixture. The organic mixture is then contacted with an aqueous phase comprising water and a catalyst metal precursor, which by hydrolysis of the support metal precursor, at the interface between the organic mixture and the aqueous phases, produces the oxide of the support metal. This product is then dried and calcined to produce the supported catalyst material with the catalyst metal dispersed therein.

Also disclosed by this application is a supported catalyst made up of a support material with nanosized channels and pores, and a catalyst metal component supported on the support material. The nanosized channels and pores are formed by deposition of the support material from an organic phase containing a support material precursor, and the catalyst metal component is deposited from an aqueous phase including a water soluble catalyst metal precursor.

The presently taught synthesis strategy for creating highly organized composites has wide applications beyond those reported here, including without limitation, photocatalysis, photonic crystals, sensors and solar cells assemblies.

BRIEF DESCRIPTION OF THE DRAWINGS

The accompanying drawings which are included to provide a further understanding of the present disclosure and are incorporated in and constitute a part of this specification, illustrate various embodiments of the present disclosure and together with the detailed description serve to explain the principles of the present disclosure. In the drawings:

FIGS. 4a, 4b and 4c are CO to $CO_2$ conversion efficiency graphs, and FIG. 4d is specific surface areas of various samples;

FIGS. 7a and 7b are TEM images of a material according to the present teachings;

FIG. 10 is a series of photographs of a synthesis according to the present teachings.

DETAILED DESCRIPTION

Figure 1:
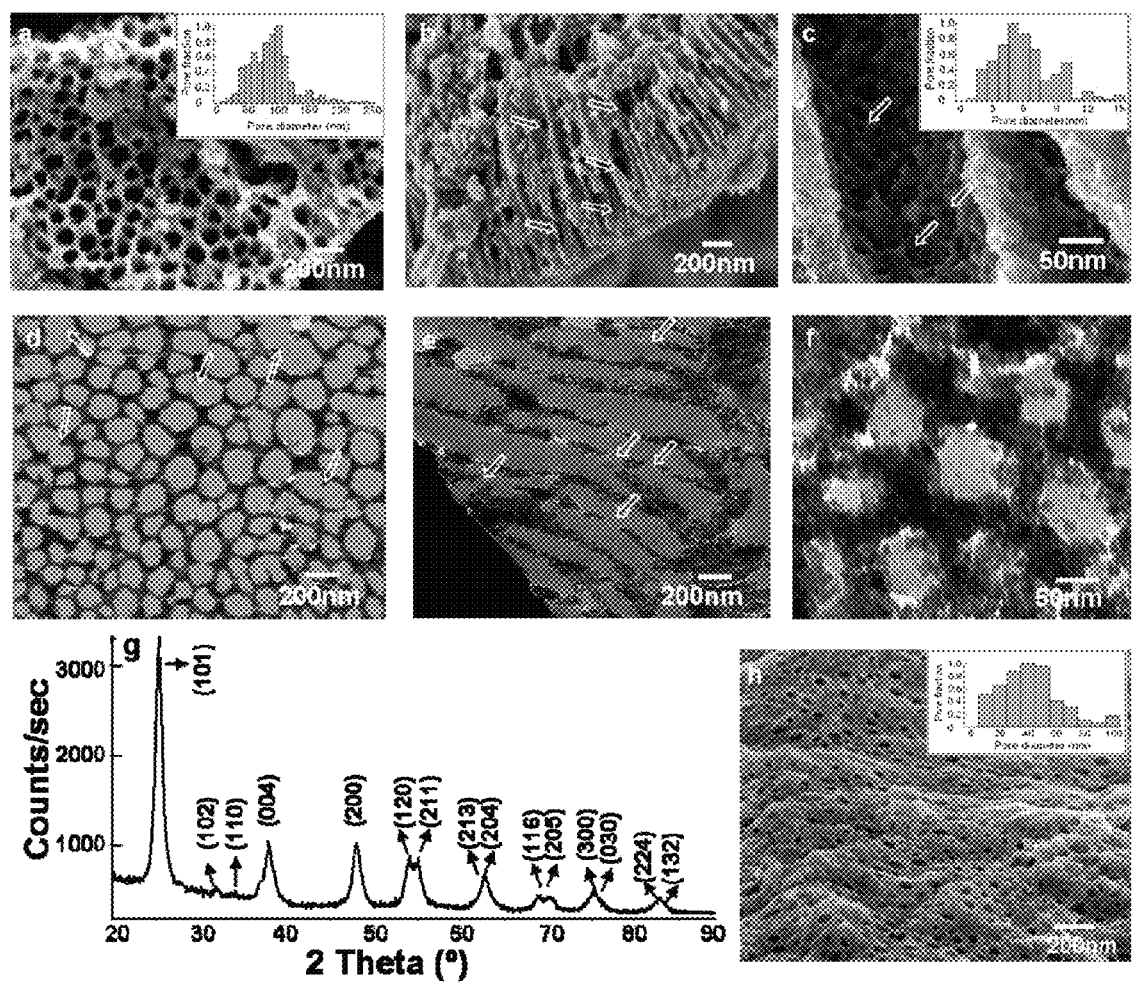
FIGS. 1a through 1c, and 1h are SEM images, 1d through 1f are TEM images, 1g is an X-ray diffractogram, and inserts a, c and h are pore diameter distributions determined from SEM images.
Figure 2:
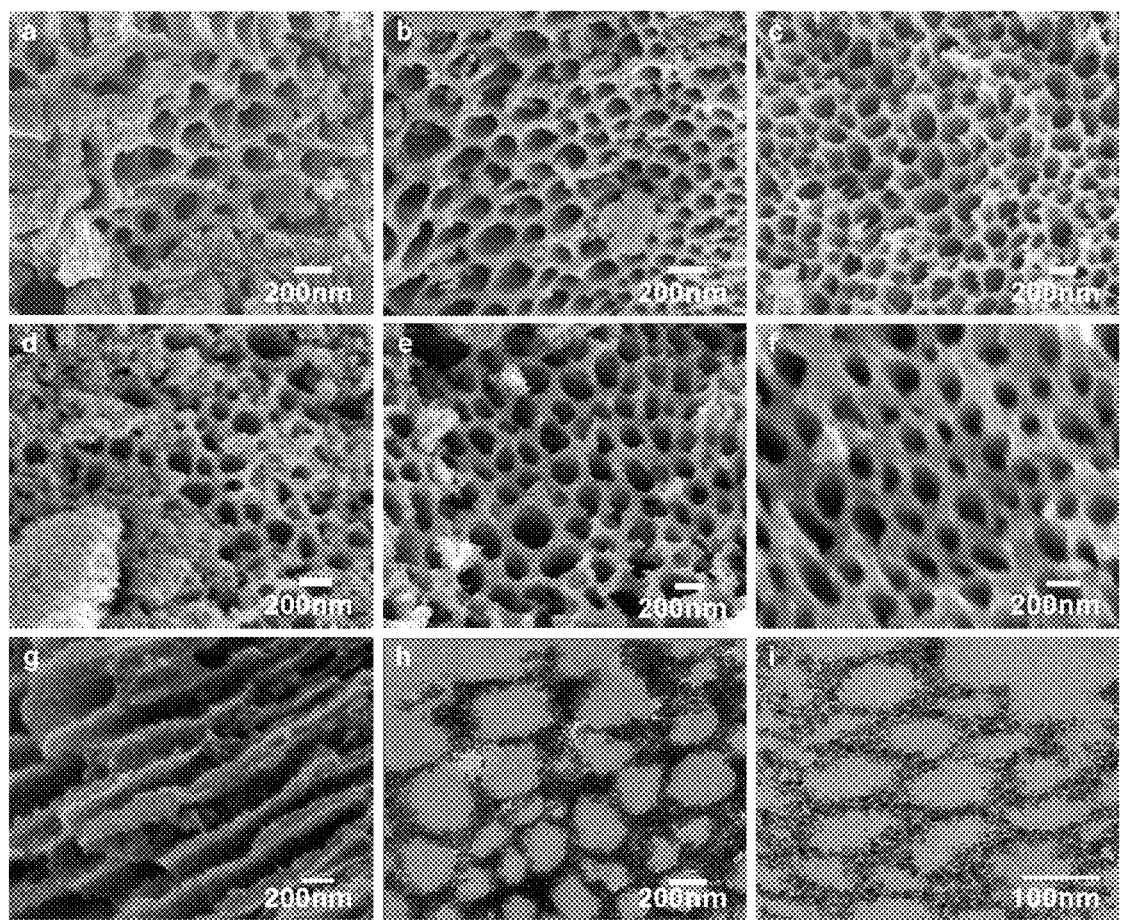
FIGS. 2a through 2g are SEM images, and 2h and 2i are TEM images of $TiO_2$ supports.

The present teachings are directed to a method of preparing a support material composition by providing a first organic phase, providing a second organic phase, and contacting the first and second organic phases to form a mixed organic phase. An aqueous phase is provided, and then contacted and mixed with the mixed organic phase to form a reaction mixture. A solid is allowed to precipitate, the reaction mixture is heated to remove the liquids, and the support material is isolated. In this present method, the first organic phase includes a non-polar, non-aqueous solvent, a surface-active agent, such as a surfactant and/or an emulsifier, and the second organic phase includes a support metal precursor and a non-polar, non-aqueous solvent. An interface between the mixed organic phase and the aqueous phase can be formed in the reaction mixture. The isolated support material is composed of the oxides of the support metal.

The non-polar, non-aqueous solvent utilized in the presently disclosed method can be a liquid hydrocarbon, for instance, pentane, hexane, heptane, and octane. One liquid hydrocarbon of interest is isooctane.

The presently disclosed method can utilize as a surface-active agent single and double-tailed cationic, anionic and non-ionic components. These single and double-tailed cationic, anionic and non-ionic components can include, for example, one or more members selected from the group consisting of AOT, lecithin, oleic acid, oleyl amine, trioctylphosphine oxide ("TOPO"), trioctyl phosphine ("TOP"), stearic acid, cetyltrimethylammonium bromide ("CTAB"), Triton® X-100 (a mixture of polyoxyethylene tert-octylphenyl ethers) and TWEEN®-80 (polysorbate 80). The surfactant, AOT, and the emulsifier, lecithin, are of particular utility in the present methods.

Within the second organic phase, the support metal precursor can be a metal alkoxide can be an alkoxide of, for example, silicon, titanium, zirconium and aluminum. Of particular interest are metal alkoxides selected from the group consisting of silicon isopropoxide, titanium isopropoxide, zirconium isopropoxide, and aluminum isopropoxide. Suitable support metals can include nearly any metal which can form a stable metal oxide.

The heating and drying of the reaction mixture comprises exposing the reaction mixture to temperatures greater than about 550° C., in a ramped fashion to remove any liquid components. The other contacting steps in the presently disclosed method can occur at room temperature.

The diameters of the macropores of the support material prepared by the presently taught method increase with increasing water content, more specifically, the ratio of water to the surface-active agent controls the size of the diameters of the macropores of the support material. The effect of water to surface-active agent concentration is discussed below in more detail, and is illustrated in FIGS. 2a through 2f, in particular.

In some embodiments of the presently disclosed method, the aqueous phase can also contain a second metal salt, typically any catalytically active metal to be dispersed within and on the support materials. This second catalyst metal can include one or more members selected from the group consisting of, for example, iron, ruthenium, cobalt, rhodium, nickel, palladium, platinum and gold.

In one example of the presently disclosed method, the synthesis of Pt-loaded $TiO_2$ composites, $PtCl_4$, a water-soluble salt precursor, was reduced by sodium borohydride to form Pt nanoparticles. The even distribution of the metal ions, here $Pt^{4+}$, throughout the gel and the gel's high viscosity can enhance the ability of the presently disclosed method to produce well-distributed catalyst metal nanoparticles. The method can result in uniformly distributed and highly separated Pt nanoparticles inside the pores of the $TiO_2$ support.

The presently disclosed supported catalyst composition can have a highly organized support structure with a bimodal pore size distribution (meso and macro) and can have catalyst nanoparticles of controllable size distributed throughout the support structure. One feature of the presently disclosed material is the uniform distribution of the catalyst nanoparticles throughout the support with minimal agglomeration and pore blocking. The presently disclosed materials typically perform similar to or better than their commercial counter parts in terms of CO oxidation and NOx reduction reactions.

The catalytic activity of materials prepared by the presently disclosed methods has been further characterized by examining the oxidation of CO to $CO_2$, and the CO conversion efficiency of the present nanocomposites is significantly better than a commercial catalyst material with a four-fold higher surface area. The higher efficacy of the present nanocomposite compositions is presently attributed, without limiting ourselves to this reasoning, to the structure of pore patterning which extends throughout the powder particles, and the pore interconnectivity, which can provide improved mass transfer of both reactants to and products from the catalyst sites present in the pores.

The present disclosure also teaches a method of preparing a supported catalyst composition comprising the steps of providing a first organic component containing a support metal component, providing an aqueous solution containing a catalyst metal, and contacting the aqueous solution with the first organic component to form an emulsion phase. A reducing agent is then provided, and contacted with the emulsion phase to form a reaction mixture, which is then heated to remove any liquid components, and the supported catalyst composition is isolated. In this disclosed method, the first organic component comprises a non-polar, non-aqueous solvent component, a surface-active agent, such as a surfactant, and/or an emulsifier, and the support metal component, the aqueous solution comprises water and the catalyst metal, and the isolated supported catalyst composition comprises oxides of the support metal arranged in a structure having both macropores and mesopores with the catalyst metal particles dispersed thereon.

This disclosed method can utilize a non-polar, non-aqueous solvent component which can be a liquid hydrocarbon, for instance, pentane, hexane, heptane, octane and isooctane.

The presently disclosed method can utilize as a surface-active agent single and double-tailed cationic, anionic and non-ionic components. These components can include, for example, one or more members selected from the group consisting of AOT, lecithin, oleic acid, oleyl amine, trioctylphosphine oxide ("TOPO"), trioctyl phosphine ("TOP"), stearic acid, cetyltrimethylammonium bromide ("CTAB"), Triton® X-100 (a mixture of polyoxyethylene tert-octylphenyl ethers) and TWEEN®-80 (polysorbate 80). The surfactant, AOT, and the emulsifier, lecithin, are of particular utility in the present methods.

The support metal component, which forms the structure of the presently taught support for the catalyst, can be an alkoxide of, for instance, silicon, titanium, zirconium and aluminum. Specific examples of suitable metal alkoxides can include at least one member selected from the group consisting of silicon tetramethoxide, silicon isopropoxide, titanium isopropoxide, zirconium isopropoxide, and aluminum isopropoxide.

The reducing agents which can be utilized in the present method can include, for example, reducing gas atmospheres (for instance, pure $H_2$ or a mixture of $H_2$ in $N_2$ and/or He or other inert gases), sodium borohydride, 1,2-hexadecanediol, trimethylaluminum, formic acid, ammonium hydroxide, hydrazine monohydrate, sodium metal, potassium metal, sodium naphthalide, potassium triethyl borohydride, magnesium metal, magnesium anthracide, and combinations thereof. Sodium borohydride has demonstrated particular utility in the present methods.

The presently taught method includes a step of heating the reaction mixture to dry and calcine the supported catalyst composition and can include exposing the reaction mixture to temperatures greater than about 550° C. In contrast, the other steps of the presently taught method can occur at room temperature.

In the presently disclosed method, the diameters of the macropores of the support material increase with increasing water content. Typically, by increasing the ratio of water to surface-active agent, particularly the surfactant, here preferably AOT, the size of the diameters of the macropores of the support material can be increased.

The catalyst metal utilized in the presently taught method can include one or more members selected from the group consisting of, without limitation, iron, ruthenium, cobalt, rhodium, nickel, palladium, platinum and gold.

Further provided by the present disclosure is a process for the production of a supported catalyst material including the steps of providing a microemulsion comprising an organic phase containing an organic solvent, at least one surface-active agent, and preferably, both an emulsifier and a surfactant, and also providing an organic solution containing a support metal precursor dissolved in an organic solvent. Next, the organic solution is contacted with the microemulsion to form an organic mixture. Then, an aqueous phase comprising water and a catalyst metal precursor is provided, and contacted with the organic mixture to produce a product of an oxide of the support metal by hydrolysis and condensation reaction of the support metal precursor at the interface between the organic mixture and the aqueous phases. The support metal oxide is then dried and calcined to produce the supported catalyst material.

A supported catalyst is also disclosed herein. The presently taught supported catalyst includes a support material with nanosized channels and pores, and a catalyst metal component supported on the support material. For this supported catalyst, the nanosized channels and pores are formed by deposition of the support material from an organic phase comprising a support material precursor, and the catalyst metal component was deposited from an aqueous phase comprising a water soluble catalyst metal precursor. Preferably, these depositions occur at room temperature.

The support material precursor can include one or more members selected from the group consisting of Si, Ti, Al, or Zr alkoxides. Some suitable support material precursor include titanium isopropoxide and silicon tetramethoxide. The water soluble catalyst metal precursor can include one or more member selected from the group consisting of nitrates, halides, such as the chlorides, of metals, such as, iron, ruthenium, cobalt, rhodium, nickel, palladium, platinum and gold.

The presently disclosed method can be utilized to produce $TiO_2$-containing support material with highly organized pore structures having a bimodal pore size distribution in the 3 to 15 nm range and the 20 to 250 nm range. As used herein, "macropore" refers to pores having diameters ranging from between about 20 to about 250 nm, and "mesopore" refers to pores having diameters ranging from between about 3 to about 15 nm. The present definitions of "macro" and "meso" are selected in order to clearly differentiate between the larger and smaller pore sizes of the bimodal pore distribution; the IUPAC definitions would not permit such differentiation. Such materials can find tremendous application in the reforming and similar catalysis areas.

The methods and compositions of the present teachings are further explained with reference to the Examples and Figures set forth below and herein. $TiO_2$ supports were synthesized from a soft-template using isooctane, AOT, lecithin, TIP and water according to the presently disclosed method as set forth in Example 1 below. The white powder product consists of particles with pore diameters between 20 nm and 250 nm organized with hexagonal symmetry similar to the surfactant template. FIG. 1a shows a SEM micrograph of a powder particle from the sample prepared using a template that had a $W_0$ equal to 70. The average macropore diameter, obtained from the distribution, shown in the inset in FIG. 1a, is about 100 nm. Due to the inheritance of the underlying bicontinuous surfactant template morphology, the macropores are interconnected through the regions marked by the arrows in FIG. 1b. A higher magnification image, shown in FIG. 1c, reveals the mesopores (see arrows). The average size of the mesopores, determined from the SEM images, is about 5 nm. BET pore diameter distribution for the same support obtained from a 55 point analysis shows the pore diameter has essentially a bimodal distribution with maxima at 3 nm and 5.5 nm, respectively, consistent with the mesopore diameter measured using SEM. The hierarchical interconnected porous structures with bimodal pore diameter distribution can be conducive for improved access to the surfaces, including catalyst sites, inside the support for both reactants and products.

Thin-section transmission electron microscope (TEM) images of the sample from lateral and axial cross-sections, shown in FIGS. 1d and 1e, confirm that the $TiO_2$ inherits the hexagonal template morphology. Solvent removal and calcination is understood to break the long-range crystalline symmetry that existed in the original surfactant template, but the essentially hexagonal patterning is maintained. Images taken from a range of thin-sections taken from different portions of materials prepared according to the present teachings consistently show this structure, and are therefore assumed to persist throughout. The breaks in the pore walls shown by the arrows in FIG. 1e confirm macropore interconnectivity inside the support. Higher magnification TEM images reported in FIG. 1f show that the macropore walls are comprised of an assembly of fused $TiO_2$ nanoparticles.

Energy dispersive X-ray spectroscopy has shown prominent Ti and O peaks corresponding to a $TiO_{1.76}$ stoichiometry, with only trace amounts (less than 1.8 atomic %) of P, S and Na observed, suggesting that contamination of the pores from residual surface-active agents is negligible. The powder X-ray diffractogram, shown in FIG. 1g, reveals that the $TiO_2$ in the presently taught material is anatase, in agreement with earlier work showing that anatase is preferred at temperatures below 550° C. The peaks are broad, indicating that the crystallite size in the support is small. The very small peaks, at about 33° 2θ, are due to the presence of trace quantities of $Na_2SO_4$ left from the AOT surfactant after the calcination procedure. These elements were also identified in the EDS spectra.

The characteristic macropore diameters in the presently disclosed $TiO_2$ supports prepared according to the present methods are about tenfold larger than that of the template water channels determined using small angle neutron scattering ("SANS") in the bicontinuous surfactant templates that contained no TIP. Cryogenic scanning electron microscope ("cryo-SEM") images of $TiO_2$ samples prior to solvent removal, shown in FIG. 1h, reveal macropore diameters between about 20 nm to 150 nm, which are intermediate between the template feature sizes obtained by SANS and pore diameters of the calcined $TiO_2$ support measured by SEM and TEM.

According to our present theory without being limited thereto, this observation implies that one major contributing factor to the pore diameter increase is solvent evaporation, which can consolidate the $TiO_2$ nanoparticles into the walls by capillary forces. The solubility of AOT in TIP is about 0.4 g/ml. The preferential dissolution of AOT into the TIP/isooctane solution leaves excess lecithin at the aqueous/organic interfaces. Since lecithin by itself forms water pools of larger diameter in water-in-oil microemulsions, an additional factor for the observed pore diameter can be this selective loss of AOT from the isooctane/water interface. Examination of microstructures prior to and after calcination reveals only a 3% increase in macropore diameter, which is small compared to the solvent evaporation and surfactant dissolution effects.

In the presently disclosed methods, the mean pore diameter of the support structures can be tuned, without altering the qualitative features of the $TiO_2$ microstructure, by adjusting the water content. The effect of increasing the water content from $W_0=70$ to 200, shown in FIGS. 2a through 2f, results in an increase in average macropore diameter from about 100 nm to about 185 nm. The internal macropore structure remains basically unaffected with increasing $W_0$, but the macropore wall thickness increases. This effect is believed to be due to the additional water driving the TIP hydrolysis to completion. The BET surface area of the supports also increases marginally as the water content is increased, resulting in BET's of 24.4, 34.2, 37.6 and 41.9 $m^2/g$ for $W_0=70$, 100, 150 and 200, respectively.

Figure 3:
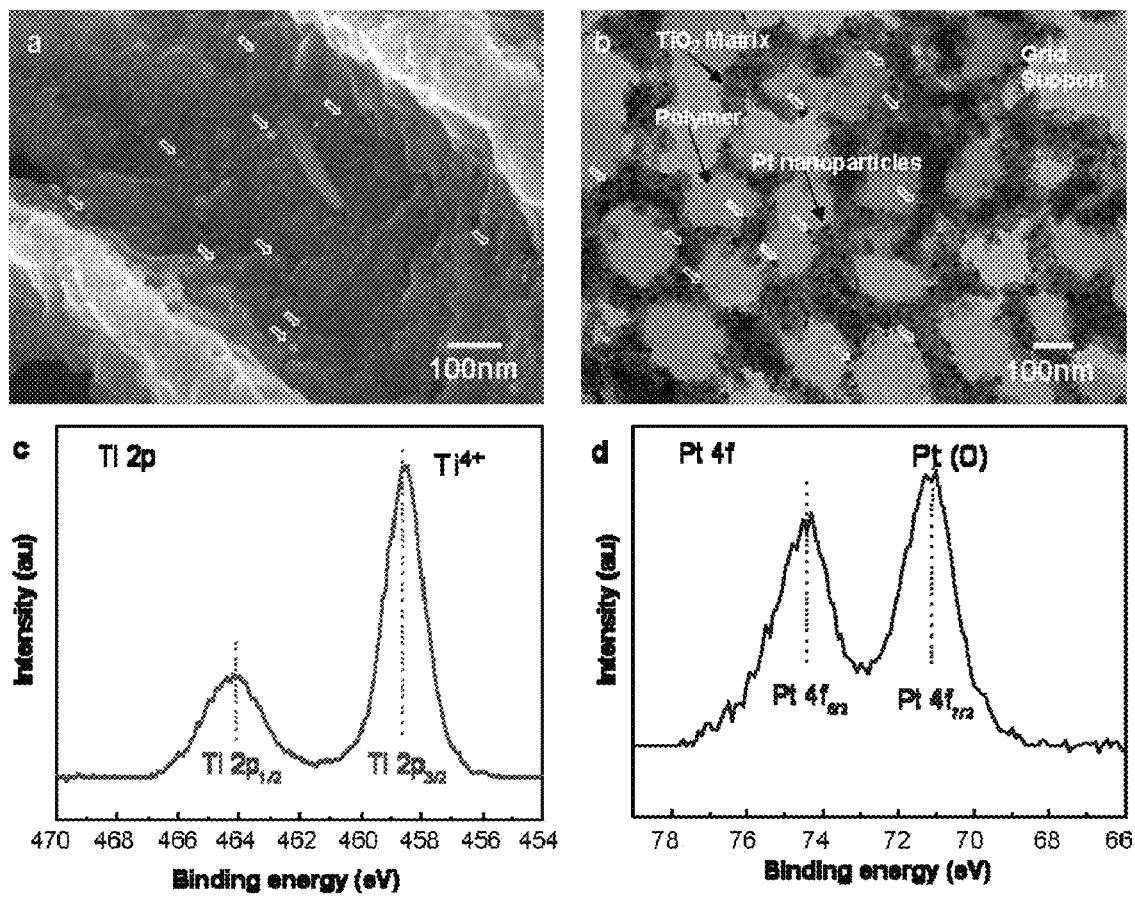
FIG. 3a is an SEM micrograph, 3b is a TEM micrograph.
FIGS. 3c and 3d are core-level spectra measured by XPS.

According to another embodiment of the presently disclosed methods, titania support synthesis can be carried out in the presence of a metal salt, such as $PtCl_4$, and then reduced in a subsequent step by adding a reducing agent, such as sodium borohydride, and $TiO_2$ supports decorated with 3-5 nm diameter Pt nanoparticles are produced. The Pt nanoparticles are well-separated and uniformly distributed on the pore surfaces, as seen in FIGS. 3a and 3b. The high viscosity (zero shear viscosity of about $10^5$ poise) of the underlying template can immobilize the Pt nanoparticles inside the aqueous nanochannels. The hexagonal patterning of the pores is preserved, indicating that the Pt salt reduction does not disrupt pore organization in the support. EDS spectra from the nanocomposite samples show prominent Ti, O and Pt peaks, along with trace amounts (less than 1.8 atomic %) of P and S from the surfactants (data not shown). The specific BET surface areas for the nanocomposites are 22.3, 26.9, and 36.9 $m^2/g$ for samples of $W_0=70$, 100 and 200, respectively. The surface area of the support is essentially unaffected by the addition of Pt in the support.

X-ray photoelectron spectroscopy (XPS) scans in the vicinity of the Ti 2p and Pt 4f core-level bands are shown in FIGS. 3c and 3d. The Ti $2p_{3/2}$ band at 458.5 eV corresponds to the $Ti^{4+}$ state, while the Pt $4f_{7/2}$ band at 71.1 eV is in good agreement with the $Pt^0$ state. The reaction products in the presently taught supported catalyst composition are thus titania and metallic platinum.

Figure 4A:
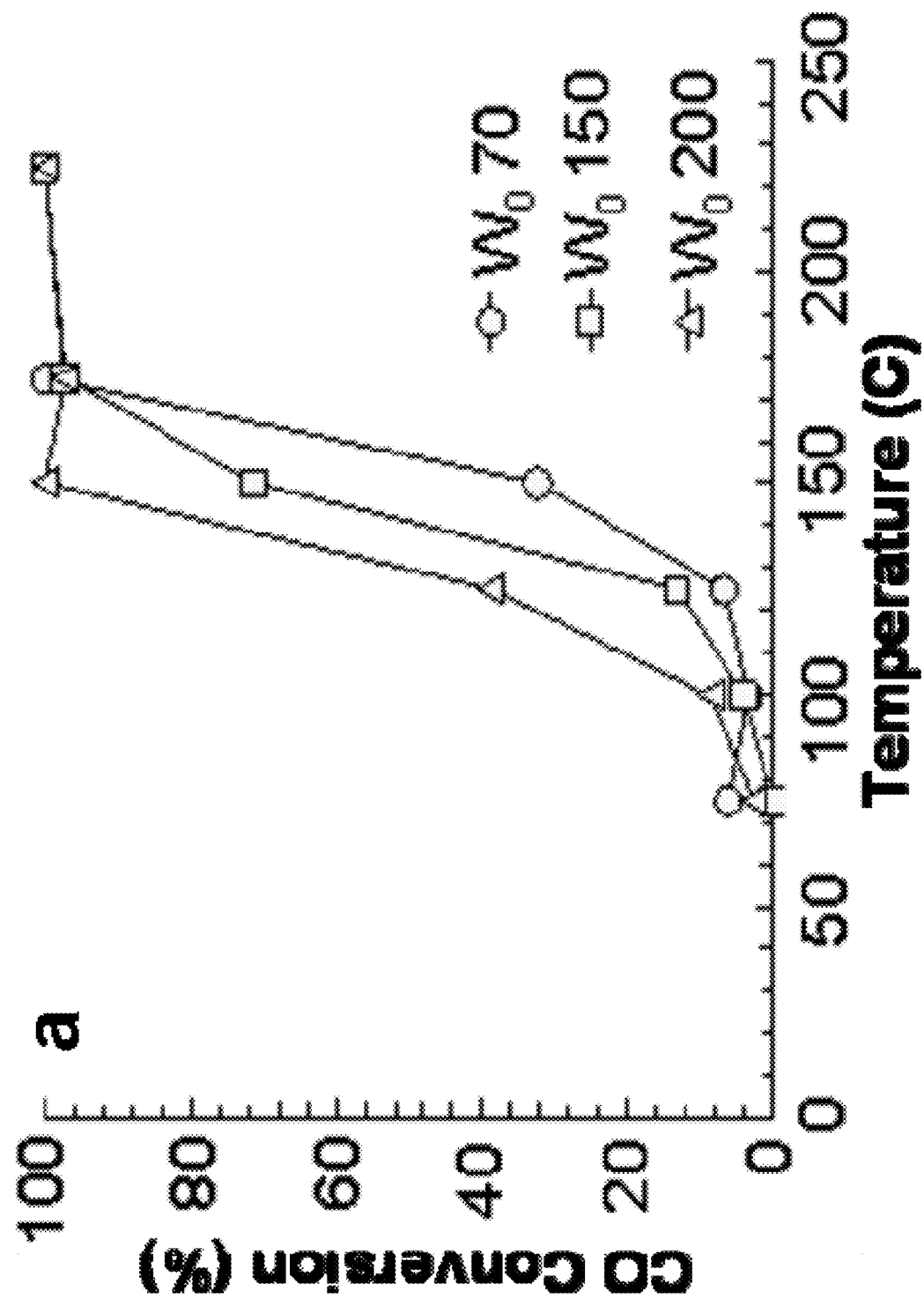

The steady state conversion for carbon monoxide oxidation to carbon dioxide using unwashed $Pt/TiO_2$ nanocomposites was measured for samples prepared according to the presently taught methods with varying $W_0$ (70, 150 and 200). These samples had Pt loadings of 0.5%, 1.5% and 1.8% by weight, respectively. CO oxidation was examined over a temperature range of 70° C. to 250° C. As shown in FIG. 4a, the conversion reached a maximum at about 150° C., and the extent of CO conversion increased with increased Pt loading as expected.

FIG. 4b shows that increasing aqueous content, which increases the specific surface area of the support, does not appear to a very significant effect on the activity of the composites. Here, each composite had an overall Pt loading of 1.7 wt. %, and were washed prior to undergoing CO conversion testing. The presently disclosed methods and compositions can result in materials having highly interconnected, patterned samples, and apparently a doubling in the specific surface area does not result in additional catalyst sites being exposed to the reactants.

The catalytic activity of washed and unwashed Pt-containing nanocomposites according to the present teachings was compared to that of a commercially available $TiO_2$ support. XT 25376, available from St. Gobain-Norpro, was wet impregnated to a Pt loading of 1.8 wt. %. The unwashed material according to the present teachings performed equivalently despite having a four-fold lower specific surface area than the commercial sample (see FIG. 4c).

Figures 4C, 4D:
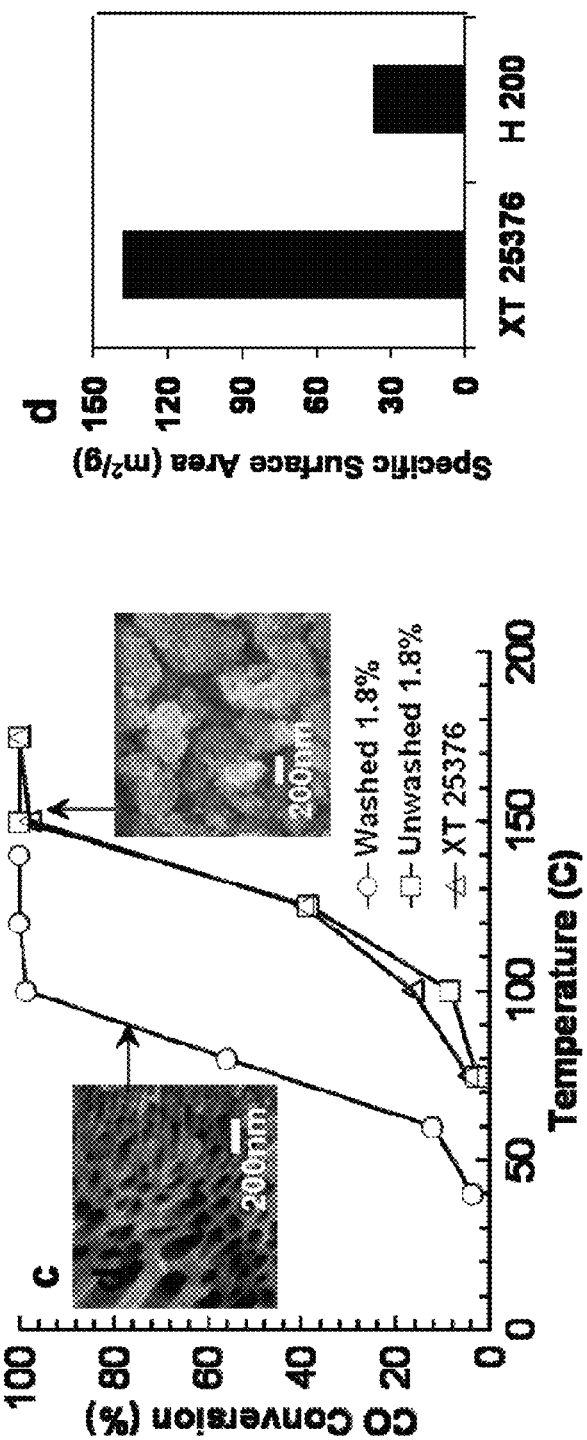

Additionally, there is a marked difference in the performance of washed and unwashed samples of the presently taught catalyst compositions. The results for samples loaded at 1.8 wt. % Pt are shown in FIG. 4c. The CO conversion versus temperature curve shifts noticeably towards lower temperatures, reaching a maximum conversion at about 100° C. for the washed sample compared to about 150° C. for the unwashed one.

Chemisorption studies were also conducted on these three samples described above. The active catalyst surface area for the commercial sample was 102.20 m²/g Pt with a 41.37% metal dispersion. The unwashed sample had an active catalyst surface area of 58.97 m²/g Pt with a 23.87% metal dispersion whereas, after washing, the nanocomposite had an active surface of 134.76 m²/g Pt with a 54.56% metal dispersion. The presently disclosed synthesis methods can produce small well-distributed Pt nanoparticles. The NaCl produced as a byproduct in one of the reaction steps can be removed by washing, allowing a higher active surface area and a better Pt dispersion.

The higher efficacy in the catalyst compositions according to the present teachings is believed to be due to lower mass transfer resistance for the reactants, as well as the products, in the highly organized interconnected macro- and meso-pores and the well-distributed discrete Pt nanoparticles. It is known that an enhanced effective mass diffusivity occurs from a patterned highly connected porous network as opposed to a more random network. See Mezedur, M. M.; Kaviany, M., and Moore, W., "Effect of pore structure, randomness and size on effective mass diffusivity," *AIChE Journal*, Vol. 48, pp. 15-24 (2002). Here, with the presently taught methods, even an unwashed sample of the presently taught composition shows an advantage over the commercial sample, and washing to remove salts results in improved performance.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the present teachings are exemplary and should not be construed as limiting the scope of the present teachings.

EXAMPLES

Experimental

Isooctane (herein "10"), AOT, TIP, platinum chloride ($PtCl_4$) and sodium borohydride ($NaBH_4$) were obtained from Sigma Aldrich. Lecithin (L-α phosphatidylcholine, 95% plant Soy) was used as received from Avanti Polar Lipids.

$W_0$ refers to the molar ratio of water to the surface-active agent(s), generally. For the Examples presented herein, only the surface-active agent AOT is utilized in the calculation of the $W_0$ ratio. For instance, $W_{70}$ refers to a reaction having 70 moles of water to 1 mole of AOT present in the reaction mixture. As used herein, room temperature refers to a temperature ranging from 20 to 25° C. (68 to 77° F.)

Microanalytical Characterization

A Hitachi S-4800 Field Emission SEM was used to characterize the support microstructure and nanoparticle dispersions. An Oxford INCA system was used for the EDS elemental analysis. Thin sections of samples for TEM measurements were prepared using a MT2-B DuPont Ultramicrotome by embedding the powder particles into an epoxy resin, curing overnight and cutting 70-90 nm thick slices using a diamond knife. TEM images were obtained in a JEOL 1200 EX instrument operated at 120 kV. A Bruker D8 Advanced X-Ray diffractometer was used for phase identification. Core-level spectra from the samples were obtained by XPS using a PHI 5400 instrument with a Mg Kα source. The spectra were collected using a pass energy of 23.5 eV, and corrected for charging by using the adventitious carbon is peak at 285 eV.

Hydrogen chemisorption on a Micrometrics AutoChem 2910 was used to obtain the active metal surface area and dispersion of Pt. Hydrogen reduction was first used to prepare the samples. Approximately 0.5 g of sample was loaded for each experiment and reduced in situ in a 10% $H_2$/90% He mix at 300° C. for 1 hr. The flow was then stopped and the sample allowed to degas for 3 hrs at 300° C. and then brought to room temperature. The sample was then introduced to Ar carrier at 50 ml/min, and the temperature was ramped to 50° C. at 5° C./min to purge any reduction products.

For pulse chemisorption, $H_2$ was introduced using a 10% $H_2$-90% Ar mixture with 100% Ar as the background carrier gas. 100 μL of the mixture was dosed every 3 minutes until no further hydrogen was chemisorbed, and the amount of adsorbed $H_2$ was calculated. The Pt specific surface area (surface area of Pt/gm of Pt) and dispersion were calculated assuming a $H_2$/Pt stoichiometry of 2.

Example 1

Porous Titania Synthesis

TIP was added in a 1:1 volume ratio with isooctane to a solution of isooctane/AOT (0.8M)/lecithin (0.4M). A calculated amount of water, corresponding to the desired $W_0$, was added to this solution, and mixed using a vortex mixer. Immediately after water addition, a white precipitate was observed indicating $TiO_2$ formation.

Figure 5:
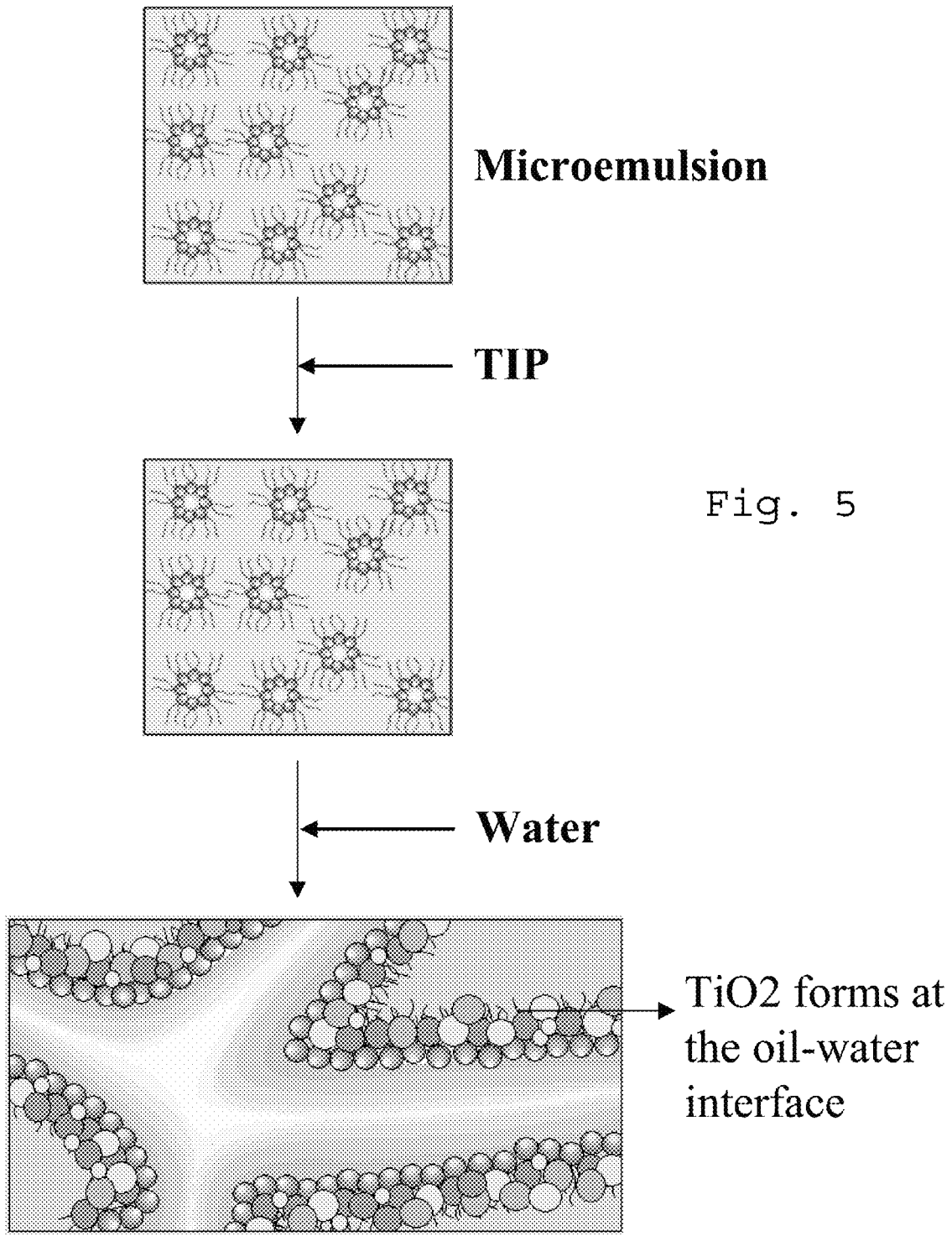
FIG. 5 is a representation of a synthetic route according to the present teachings.
Figure 6:
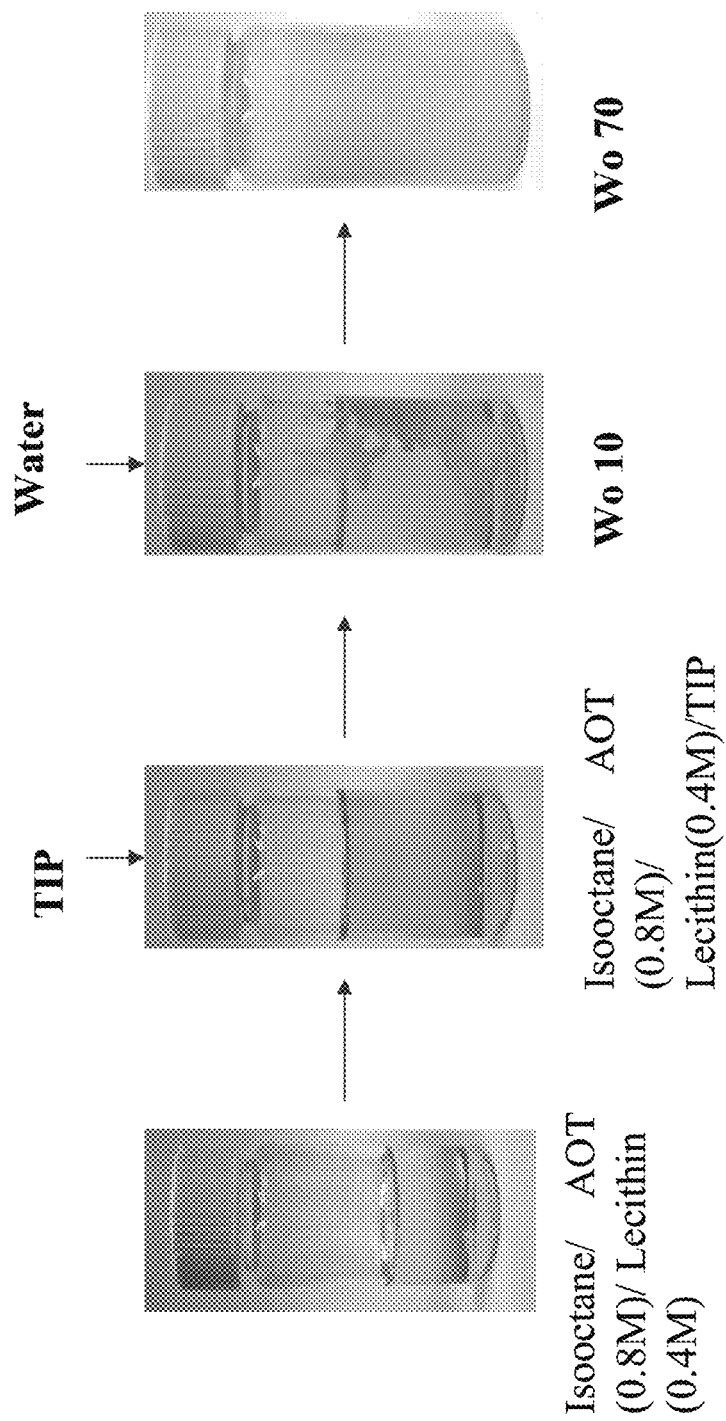
FIG. 6 is a series of photographs of a synthesis according to the present teachings.
Figure 8:
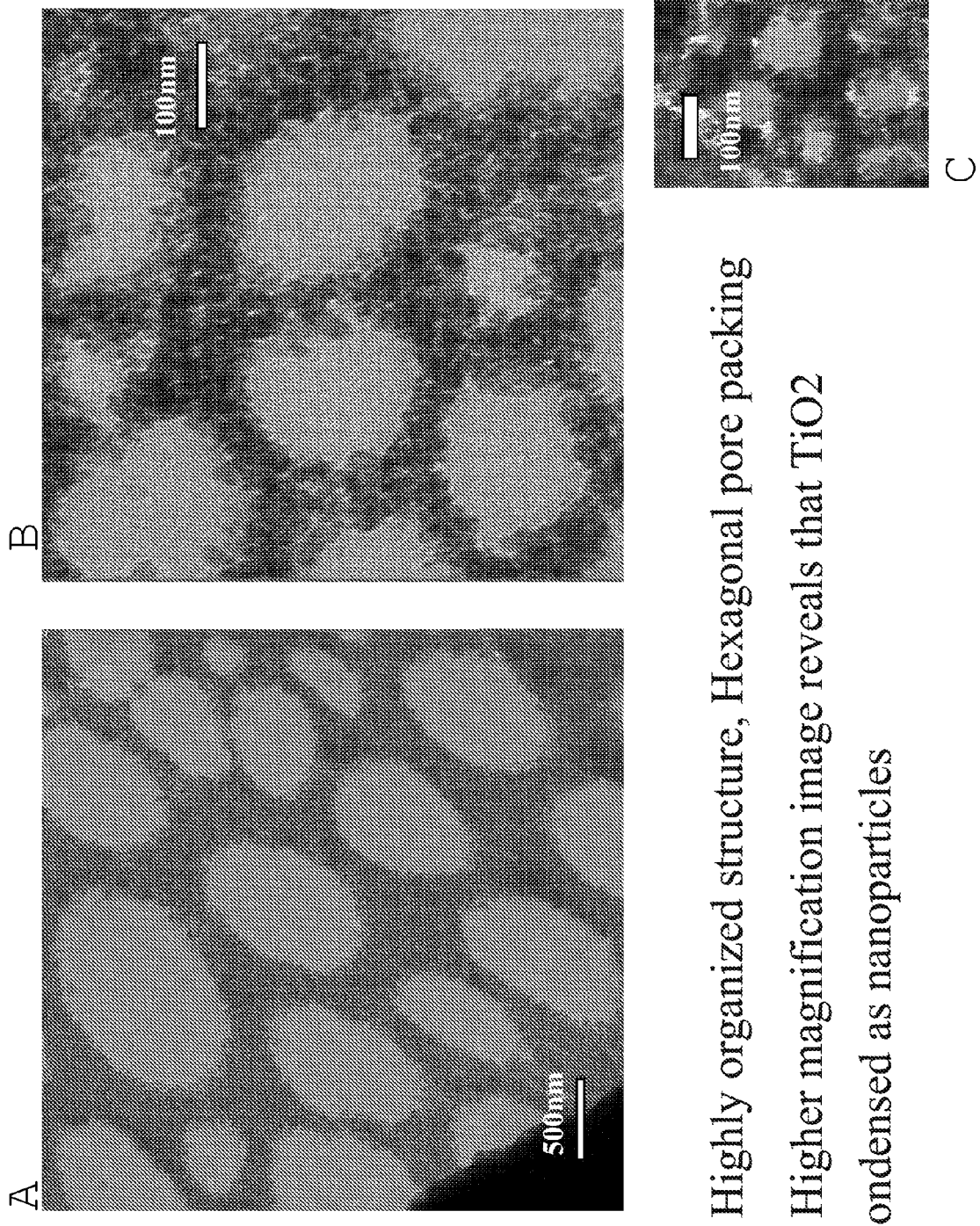
FIGS. 8a through 8c are TEM images of a material according to the present teachings.
Figure 9:
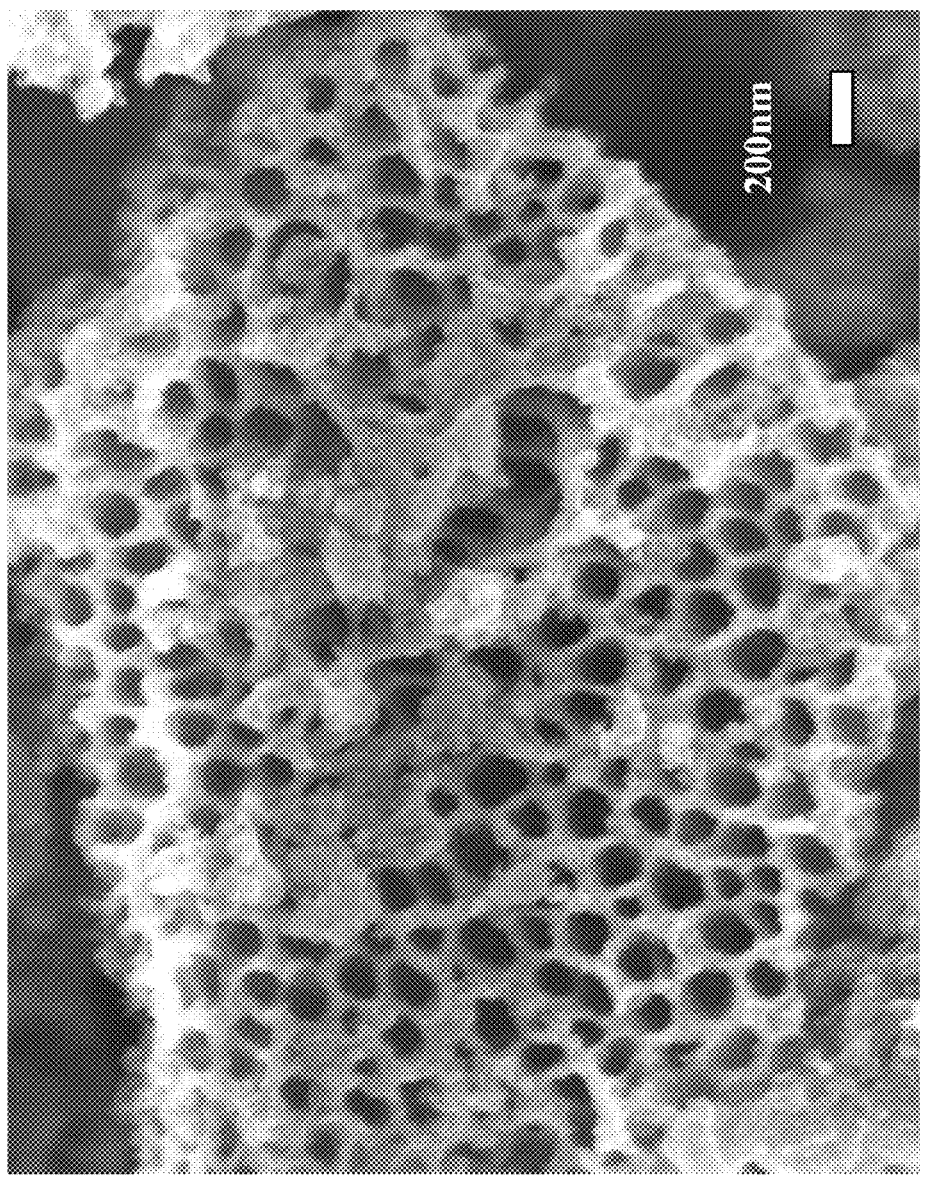
FIG. 9 is an SEM image of a material according to the present teachings.

The samples were dried at 60° C. for 24 hrs and calcined by ramping the temperature in increments of 50° C. every 30 min, starting at 400° C. and going to 550° C. The sample was left at 550° C. for 4.5 hr to obtain a white powder. The calcination step is believed to eliminate any trace amounts of surfactants left after solvent removal. This synthesis scheme is presented in FIGS. 5 and 6, and various SEM images of the resulting product are presented in FIGS. 7, 8 and 9.

Example 2

Pt-loaded Titania Nanocomposite Synthesis

An aqueous solution (0.015M) of $PtCl_4$ was added to a solution of TIP/isooctane/AOT/lecithin to reach a desired $W_0$. Then a 0.1 M $NaBH_4$ solution was added to reduce the $PtCl_4$. A slight excess of reducing agent was used to ensure complete reduction of the $Pt^{4+}$ ions. The sample underwent a color change from a light yellow to black, indicating the reduction of $Pt^{4+}$ ions to Pt metal. The samples were then dried at 60° C. for 24 hrs and calcined by ramping the temperature in increments of 50° C. every 30 min, starting at 400° C. and going to 550° C. The sample was left at 550° C. for 4.5 hr to obtain the final sample. This synthesis scheme is illustrated in FIG. 10.

Small quantities of NaCl are produced from the sodium ions formerly associated with the reducing agent and the chloride ions formerly associated with the platinum salt. The presence of NaCl within the pores can block some active sites on the catalyst. A number of samples were washed with distilled deionized water five times after calcination to remove any NaCl present therein.

Samples of the Pt-loaded titania nanocomposites according to the present teachings were prepared at various $W_0$ levels including 70, 100, 130, 150, 170 and 200, and at various Pt loadings (wt. % Pt) including 0.5, 1.5 and 1.8.

Catalyst Activity

The catalytic activity of the samples was characterized for CO oxidation using steady state conversion in a fixed bed reactor (eight-channel fixed-bed reactor—Celero). A gas mixture containing 1100 ppm CO, 5% $O_2$, and the remaining $N_2$, was delivered via mass flow controllers at a GHSV of 50,000 $h^{-1}$. The gases were passed through a pre-heater before contacting the catalyst bed. Upon reaching the desired temperature, the reaction was allowed to achieve steady state, and was held at that temperature for 1 hour prior to sampling. The product gases were analyzed using a gas chromatograph equipped with a methanizer and field ionization detector (Shimadzu GC-17A). The conversion was calculated based upon the $CO/CO_2$ ratios in the inlet and product streams.

For the unwashed samples, 0.15 g of the nanocomposite were placed in a 3 mm reaction well. For the washed samples, the amount of nanocomposite was reduced to 0.05 g and the GHSV was increased to 300,000 $h^{-1}$.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What we claim is:

1. A method of preparing a support material composition comprising:
providing a first organic phase;
providing a second organic phase;
contacting the first and second organic phases to form a mixed organic phase;
providing an aqueous phase;
contacting and mixing the mixed organic phase and the aqueous phase to form a reaction mixture having an interface between the mixed organic phase and the aqueous phase;
allowing a solid to precipitate;
heating the reaction mixture to remove the liquids; and
isolating a support material having macropores,
wherein the first organic phase comprises a first non-polar, non-aqueous solvent and at least one surface-active agent, the second organic phase comprises a second non-polar, non-aqueous solvent and at least one support metal precursor, and the support material comprises an oxide or oxides of the at least one support metal precursor,
the first and second non-polar, non-aqueous solvents independently comprise one or more members selected from the group consisting of pentane, hexane, heptane, and octane,
the surface-active agent comprises at least one or more members selected from the group consisting of oleic acid, oleyl amine, trioctylphosphine oxide, trioctyl phosphine, stearic acid, cetyltrimethylammonium bromide, polysorbate 80, and a mixture of polyoxyethylene tert-octylphenyl ethers, and
the at least one support metal precursor comprises an alkoxide of one or more metals selected from the group consisting of silicon, zirconium and aluminum.

2. The method according to claim 1, wherein the alkoxide comprises an at least one member selected from the group consisting of silicon isopropoxide, zirconium isopropoxide, and aluminum isopropoxide.

3. The method according to claim 1, wherein heating the reaction mixture comprises exposing the reaction mixture to temperatures greater than about 550° C.

4. The method according to claim 1, wherein the contacting occurs at room temperature.

5. The method according to claim 1, wherein the aqueous phase further comprises a second metal salt.

6. The method according to claim 5, wherein the second metal salt comprises one or more members selected from the group consisting of iron, ruthenium, cobalt, rhodium, nickel, palladium, and gold.

7. A method of preparing a support material composition comprising:
providing a first organic phase;
providing a second organic phase;
contacting the first and second organic phases to form a mixed organic phase;
providing an aqueous phase;
contacting and mixing the mixed organic phase and the aqueous phase to form a reaction mixture having an interface between the mixed organic phase and the aqueous phase;
allowing a solid to precipitate;
heating the reaction mixture to remove the liquids; and
isolating a support material having macropores,
wherein the first organic phase comprises a first non-polar, non-aqueous solvent and at least one surface-active agent, the second organic phase comprises a second non-polar, non-aqueous solvent and at least one support metal precursor, and the support material comprises an oxide or oxides of the at least one support metal precursor,
the first and second non-polar, non-aqueous solvents independently comprise one or more members selected from the group consisting of pentane, hexane, heptane, and octane,
the surface-active agent comprises at least one or more members selected from the group consisting of oleic acid, oleyl amine, trioctylphosphine oxide, trioctyl phosphine, stearic acid, cetyltrimethylammonium bromide, polysorbate 80, and a mixture of polyoxyethylene tert-octylphenyl ethers,
the at least one support metal precursor comprises an alkoxide of one or more metals selected from the group consisting of silicon, zirconium and aluminum, and
the diameters of the macropores of the support material increase with increasing water content.

8. The method according to claim 7, wherein the alkoxide comprises an at least one member selected from the group consisting of silicon isopropoxide, zirconium isopropoxide, and aluminum isopropoxide.

9. The method according to claim 7, wherein heating the reaction mixture comprises exposing the reaction mixture to temperatures greater than about 550° C.

10. The method according to claim 7, wherein the contacting occurs at room temperature.

11. The method according to claim 7, wherein the aqueous phase further comprises a second metal salt.

12. The method according to claim 11, wherein the second metal salt comprises one or more members selected from the group consisting of iron, ruthenium, cobalt, rhodium, nickel, palladium, and gold.

13. A method of preparing a support material composition comprising:
providing a first organic phase;
providing a second organic phase;
contacting the first and second organic phases to form a mixed organic phase;
providing an aqueous phase;
contacting and mixing the mixed organic phase and the aqueous phase to form a reaction mixture having an interface between the mixed organic phase and the aqueous phase;
allowing a solid to precipitate;
heating the reaction mixture to remove the liquids; and
isolating a support material having macropores,
wherein the first organic phase comprises a first non-polar, non-aqueous solvent and at least one surface-active agent, the second organic phase comprises a second non-polar, non-aqueous solvent and at least one support metal precursor, and the support material comprises an oxide or oxides of the at least one support metal precursor,
the first and second non-polar, non-aqueous solvents independently comprise one or more members selected from the group consisting of pentane, hexane, heptane, and octane,
the surface-active agent comprises at least one or more members selected from the group consisting of oleic acid, oleyl amine, trioctylphosphine oxide, trioctyl phosphine, stearic acid, cetyltrimethylammonium bromide, polysorbate 80, and a mixture of polyoxyethylene tert-octylphenyl ethers,
the at least one support metal precursor comprises an alkoxide of one or more metals selected from the group consisting of silicon, zirconium and aluminum, and
wherein the ratio of water to surface-active agent controls the size of the diameters of the macropores of the support material.

14. The method according to claim 13, wherein the alkoxide comprises an at least one member selected from the group consisting of silicon isopropoxide, zirconium isopropoxide, and aluminum isopropoxide.

15. The method according to claim 13, wherein heating the reaction mixture comprises exposing the reaction mixture to temperatures greater than about 550° C.

16. The method according to claim 13, wherein the contacting occurs at room temperature.

17. The method according to claim 13, wherein the aqueous phase further comprises a second metal salt.

18. The method according to claim 17, wherein the second metal salt comprises one or more members selected from the group consisting of iron, ruthenium, cobalt, rhodium, nickel, palladium, and gold.

* * * * *